(12) United States Patent
Stanhope (10) Patent No.: US 11,326,703 B2
(45) Date of Patent: May 10, 2022

(54) OIL CONTROL VALVE FOR A CAM PHASER OF AN INTERNAL COMBUSTION ENGINE AND A CAM PHASER COMPRISING AN OIL CONTROL VALVE

(71) Applicant: ECO Holding 1 GmbH, Marktheidenfeld (DE)

(72) Inventor: Daniel Stanhope, Nunica, MI (US)

(73) Assignee: ECO Holding 1 GmbH, Marktheidenfeld (DE)

( * ) Notice: Subject to any disclaimer, the term of this patent is extended or adjusted under 35 U.S.C. 154(b) by 119 days.

(21) Appl. No.: 17/061,673

(22) Filed: Oct. 2, 2020

(65) Prior Publication Data
US 2022/0107028 A1 Apr. 7, 2022

(51) Int. Cl.
| | |
|---|---|
| *F16K 11/07* | (2006.01) |
| *F16K 15/18* | (2006.01) |
| *F01L 1/34* | (2006.01) |
| *F01L 1/344* | (2006.01) |

(52) U.S. Cl.
CPC ........ *F16K 11/0704* (2013.01); *F01L 1/3442* (2013.01); *F16K 15/18* (2013.01); *F01L 2001/34426* (2013.01); *F01L 2001/34459* (2013.01)

(58) Field of Classification Search
CPC ............... F16K 11/0704; F01L 1/3442; F01L 2001/34426; F01L 2001/34459
See application file for complete search history.

(56) References Cited

U.S. PATENT DOCUMENTS

| | | | |
|---|---|---|---|
| 11,092,045 B1* | 8/2021 | Parker | F01L 1/3442 |
| 2014/0311333 A1* | 10/2014 | Hutzelmann | F15B 15/20 |
| | | | 91/418 |
| 2014/0311594 A1* | 10/2014 | Hutzelmann | F01L 1/3442 |
| | | | 137/490 |
| 2016/0010515 A1* | 1/2016 | Snyder | F01L 1/3442 |
| | | | 123/90.15 |
| 2017/0260884 A1* | 9/2017 | Nance | F01L 1/047 |
| 2018/0363514 A1* | 12/2018 | Stanhope | F01L 1/3442 |
| 2019/0085736 A1* | 3/2019 | Stanhope | F01L 1/3442 |
| 2019/0257222 A1* | 8/2019 | Stanhope | F01L 1/3442 |
| 2019/0257224 A1* | 8/2019 | Bartel | F01L 1/34409 |
| 2020/0248822 A1* | 8/2020 | Stanhope | F16K 11/0716 |

* cited by examiner

*Primary Examiner* — Kelsey E Cary
(74) *Attorney, Agent, or Firm* — Von Rohrscheidt Patents (57) ABSTRACT

An oil control valve for a cam phaser of an internal combustion engine, the oil control valve including a valve housing, including a first operating connection, a second operating connection, a supply connection, and a tank drain connection configured to drain a hydraulic fluid; a piston assembly, including a piston, a hollow check valve tube, a first check valve and a second check valve configured to provide cam torque recirculation, wherein the piston assembly is arranged in the housing axially displaceable by an actuator, wherein a control chamber is arranged within the piston between the first check valve and the second check valve and wherein a check valve compression spring which closes the first check valve and the second check valve is arranged within the piston between the first check valve and the second check valve.

12 Claims, 8 Drawing Sheets

OIL CONTROL VALVE FOR A CAM PHASER OF AN INTERNAL COMBUSTION ENGINE AND A CAM PHASER COMPRISING AN OIL CONTROL VALVE

FIELD OF THE INVENTION

The invention relates to an oil control valve for a cam phaser of an internal combustion engine and a cam phaser of an internal combustion engine including an oil control valve.

BACKGROUND OF THE INVENTION

Cam phasers are used in valve trains of internal combustion engines to variably adjust a phase relationship between the crankshaft and the camshaft in an optimum manner. Thus, oil control valves or hydraulic valves are being used to control a fluid flow between a pressurized fluid supply and the cam phaser and between the cam phaser and a reservoir or tank. Oil control valves of this type have plural control positions that facilitate adjusting a path of a fluid flow. Thus, an adjustment of the cam phaser and thus of the camshaft into a predetermined phase orientation is performed as a function of a control position.

Oil control valves or hydraulic valves for cam phasers for internal combustion engines are well known in the art. The oil control valve comprises a valve housing, including at least a first operating connection, a second operating connection, a supply connection, and a tank drain connection configured to drain a hydraulic fluid. Furthermore, the oil control valve comprises a piston assembly, including a piston, a check valve tube, a first check valve and a second check valve enabling cam torque recirculation, wherein the piston assembly is arranged in the housing axially movable by an actuator, wherein a control chamber is arranged within the piston between two check valves and a compression check valve spring which seats the check valves.

BRIEF SUMMARY OF THE INVENTION

An object of the invention is to improve an oil control valve recited supra regarding performance and packaging. According to one aspect of the invention, the object is achieved by an oil control valve, which comprises a valve housing, including at least a first operating connection, a second operating connection, a supply connection, and a tank drain connection configured to drain a hydraulic fluid. Furthermore, the oil control valve comprises a piston assembly, including a piston, a check valve tube, a first check valve and a second check valve enabling cam torque recirculation, wherein the piston assembly is arranged in the housing axially movable by an actuator, wherein a control chamber is arranged within the piston between the check valves and which is penetrated by the compression check valve spring. The valve housing further comprises a self-centering connection and a locking pin connection for self-centering and locking the rotor relative to the stator. The self-centering connection is connected to the supply connection in all positions of the piston. The improved oil control valve has the advantage of combining improved packaging and more effective cam torque recirculation. As the self-centering port is permanently connected with constant pressure with the axial supply port in all positions of the oil control valve, the design allows self-centering if engine stalls as soon as oil pressure drops. Thus, this design will also find its way back to the lock position even if the car engine fails, so that the improved oil control valve has a fail-safe function.

The oil control valve may be permanently connected to the supply connection by the openings of the hollow check valve tube and to the self-centering connection by openings of the piston. This design has the advantage of a smaller volume of S and P. That results in more effective cam torque recirculation.

The first connection may be associated with an advancing port, the second operating connection may be associated with a retarding port, the supply connection may be associated with a pressure supply port, the tank drain connection may be associated with a tank port, the locking pin connection may be associated with a locking pin port and the self-centering connection may be associated with a self-centering port, wherein the advancing port, the retarding port, the tank port, the locking pin port and the self-centering port may be radially arranged as radial openings in the valve housing and the pressure supply port may be axially arranged in the valve housing. Thus, the control valve is configured very short or compact in the axial direction which saves space in the joint arrangement with the cam phaser and provides space for new functional components as required.

The self-centering port may be arranged between the advancing port and the retarding port and the locking pin port may be arranged between the advancing port and the tank port.

The oil control may be configured movable into at least four positions: a starting position of the piston for self-centering and locking the rotor relative to the stator, wherein the self-centering port is connected to the pressure supply port and the check valves allow cam torque recirculation of oil from the advancing port and from the retarding port to the self-centering port, and wherein the locking pin port is connected to the tank port, a second position of the piston, wherein the retarding port and the self-centering port are connected to the pressure supply port and wherein the first check valve allows recirculation of oil from the advancing port to the retarding port, and wherein the connection between the locking pin port to the tank port is blocked, a middle position of the piston, wherein piston lands block connections to the advancing port and the retarding port, an end position of the piston, in which the advancing port is connected to the pressure supply port, and wherein the second check valve allows recirculation of oil from the retarding port to the advancing port, and wherein the connection between the locking pin port to tank port is blocked, wherein the self-centering port is permanently connected to the pressure supply port.

The oil control valve may be pressure balanced by the differential diameters of the piston, so that the performance of the oil control valve is improved.

The oil control valve may be configured with a first disc portion and a second disc portion and the second check valve may be configured with a first disc portion and a second disc portion and the check valves may be arranged offset from each other by the check valve spring so that the control chamber is formed between the first disc portions, wherein the second disc portions may be axially movable on the check valve tube and may include opposite opening directions.

The oil control valve may be configured with stop elements to limit an axially movement of the check valves in the direction of the control chamber. Therefore, it can advantageously be ensured that the supply connection P remains open—especially during a cam torque recirculation function (CTR).

The oil control valve may be configured as larger diameter portions of the check valve tube. Such a check valve tube is easy to produce. No additional parts are needed.

According to another aspect of the invention, the object is achieved by a cam phaser of an internal combustion engine, with the control valve.

The cam phaser may comprise a rotor comprising a plurality of vanes, a stator engaged with the rotor, said stator may comprise a plurality of webs, wherein first pressure chambers and second pressure chambers may be provided between each of the webs and vanes, a lock pin which may be arranged in a pressure medium control valve chamber and may lock the rotor relative to the stator at a mid-lock position, the oil control valve in fluid communication with the rotor, wherein the rotor may comprise a centering slot on its outer surface, that is in fluid communication with the pressure medium control valve chamber, and at least slot on its outer surface for supplying pressure medium to either chamber, depending on the position of the rotor relative to the stator.

The cam phaser may comprise a self-centering spool which is arranged in a vane of the rotor for supplying pressure medium to either chamber from supply connection through self-centering connection of the oil control valve depending on the position of the rotor relative to the stator.

BRIEF DESCRIPTION OF THE DRAWINGS

Other advantages, features and details of the invention can be derived from the subsequent description of advantageous embodiments and from the drawing figures. The features and feature combinations recited in the preceding description and the features and feature combinations recited and shown individually in the figure description and in the figures are not only usable in the respectively recited combination but also in other combinations or by themselves without departing from the spirit and scope of the invention. Identical or functionally equivalent elements are designated with identical reference numerals. For reasons of clarity it is possible that elements are not designated with reference numerals in all figures without losing their association, wherein.

DETAILED DESCRIPTION OF THE INVENTION

While this invention may be embodied in different forms that are shown in the drawing figures and will be described herein in detail, specific embodiments are shown and described with the understanding that the present disclosure is to be considered an exemplification of the principles of the invention, and does not limit the spirit and scope of the invention.

The present invention relates to an oil control valve or center bolt oil control valve (OCV) for a valve timing control device, in effect a cam phaser, for use with an internal combustion engine. A plurality of embodiments of the present invention are disclosed herein.

A first embodiment will be described, and then additional embodiments will be described emphasizing the differences. First, the cam phaser will be described, and then embodiments of a center bolt oil control valve (OCV) will be described. Finally, the different states/positions of the OCV will be described.

Figure 1:
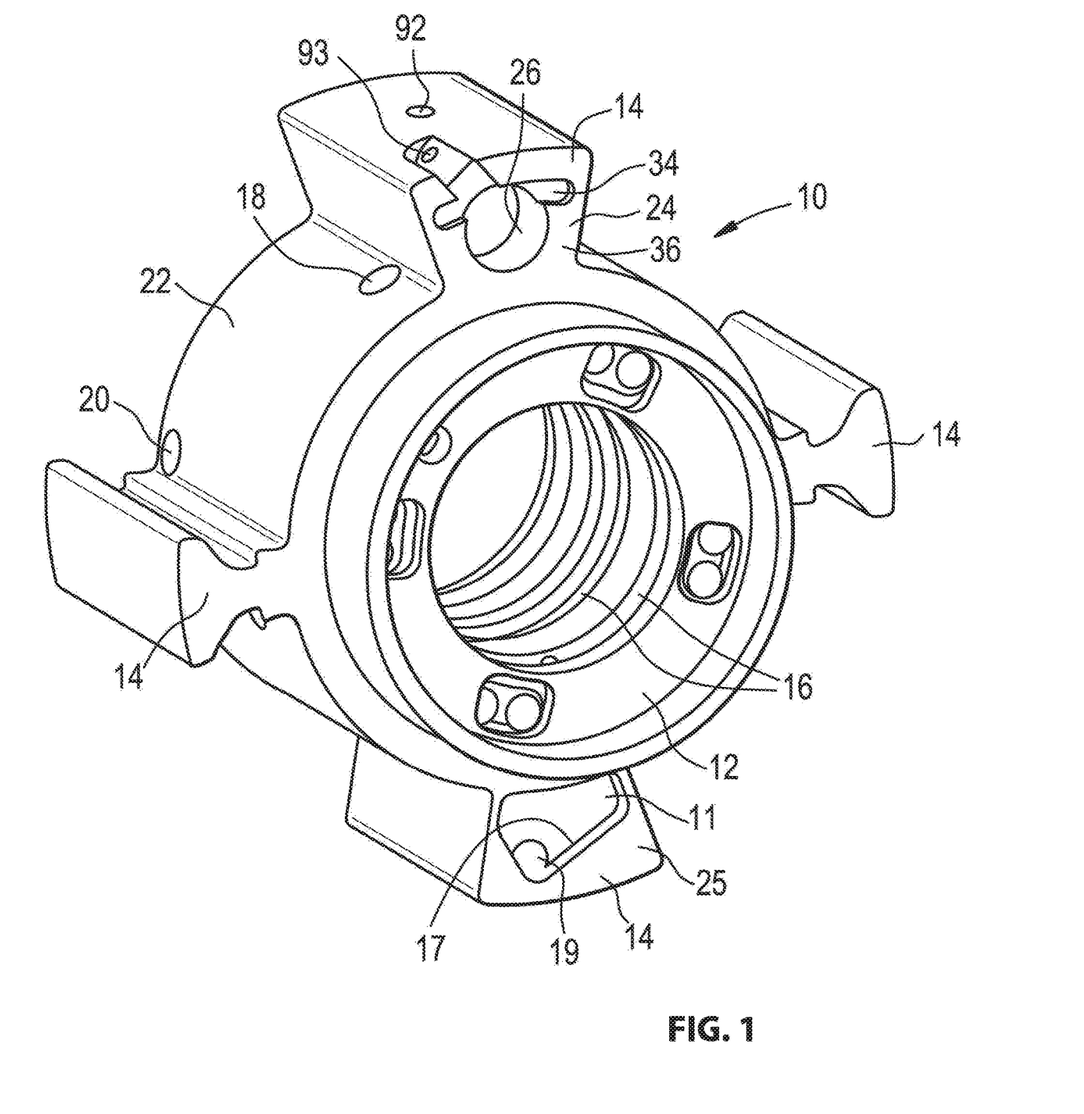
FIG. 1 is a perspective view of a rotor component of a valve timing control device or cam phaser which is in accordance with an embodiment of the present invention.

As shown in FIG. 1, a rotor 10 of the cam phaser includes a hub 12, as well as vanes 14, which protrude radially away from the hub 12. The rotor 10 also includes annular channels 16, which communicate with additional channels 18, 20 that lead to the outside surface 22 of the rotor 10. Channels 18 and 20 are similarly positioned, as shown, between each rotor vane 14. As will be described, these channels 16, 18, 20 provide fluid paths for pressure medium (i.e. oil).

Figure 3:
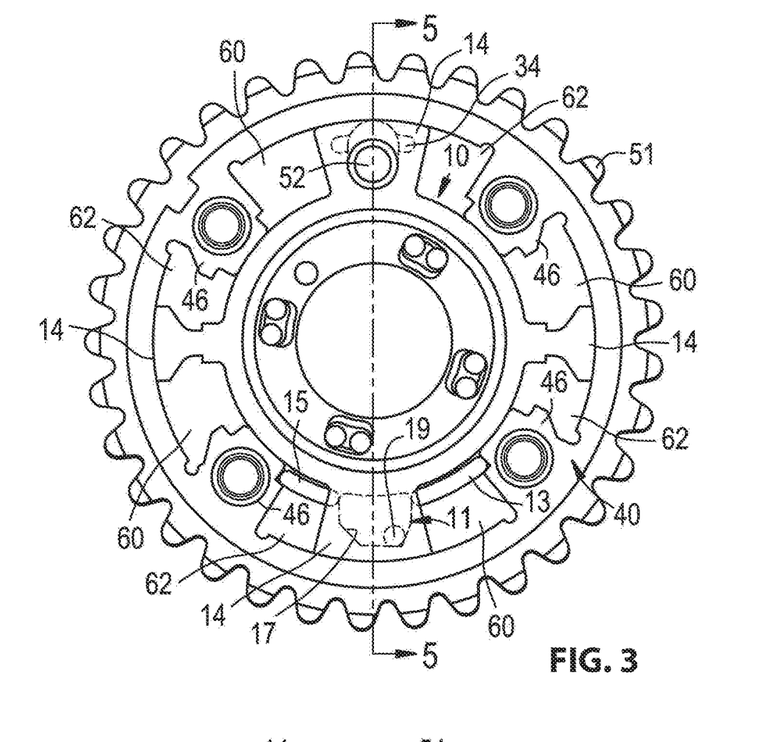
FIG. 3 shows (omitting a cover, for simplicity) the rotor and stator engaged with each other, and the rotor locked relative to the stator.

The rotor 10 also includes, in one (24) of its vanes 14, a pressure medium control valve chamber 26. As shown in FIG. 3, a pressure medium control valve such as a lock pin 52 is disposed in this chamber 26, and the rotor 10 provides internal fluid channels 30 (see FIG. 10) which lead to this chamber 26 and which communicates with at least one of the annular channels 16 provided in the hub 12 of the rotor 10. As such, pressure medium can flow between the pressure medium control valve chamber 26 and center bolt oil control valve (OCV) 32 that is shown in FIG. 5-9 in detail.

As shown in FIG. 1, proximate the pressure medium control valve chamber 26, and in fluid communication therewith, is a centering slot 34 formed on the external surface 36 of the vane 24 of the rotor 10. As will be described more fully later herein, this centering slot 34 works to provide that pressure medium can move along the centering slot 34 to the lock pin 52 when the rotor 10 is in certain positions relative to a stator 40 of the cam phaser, during certain stages of operation of the engine.

In FIG. 1, opening 92 is merely a result of manufacturing the rotor 10. Specifically, the rotor 10 is drilled into in order to form channels 30, 31 (see FIG. 10). This drilling operation results also in the formation of opening 92. In other words, the drill drills into the rotor 10 forming opening 92 and then drills further into the rotor 10 forming passageway 30. Passageway 30 is what transfers the oil to the oil control valve 32. In FIG. 1, opening 93 also connects to passageway 31, routing oil from centering slot 34 (and a centering slot 54, if the rotor is not "centered").

Preferably, the rotor 10 has no sealing on its outside. Instead, preferably sealing is effected by the length of the vanes 14 (i.e., sealing length). Preferably, there is no sealing because if a slot had to be provided for a seal on the radial outside of the vanes 14, this would reduce the available space for the pressure medium control valve chamber 26. That being said, sealing can be provided while still staying very much within the scope of the present invention.

Figure 10:
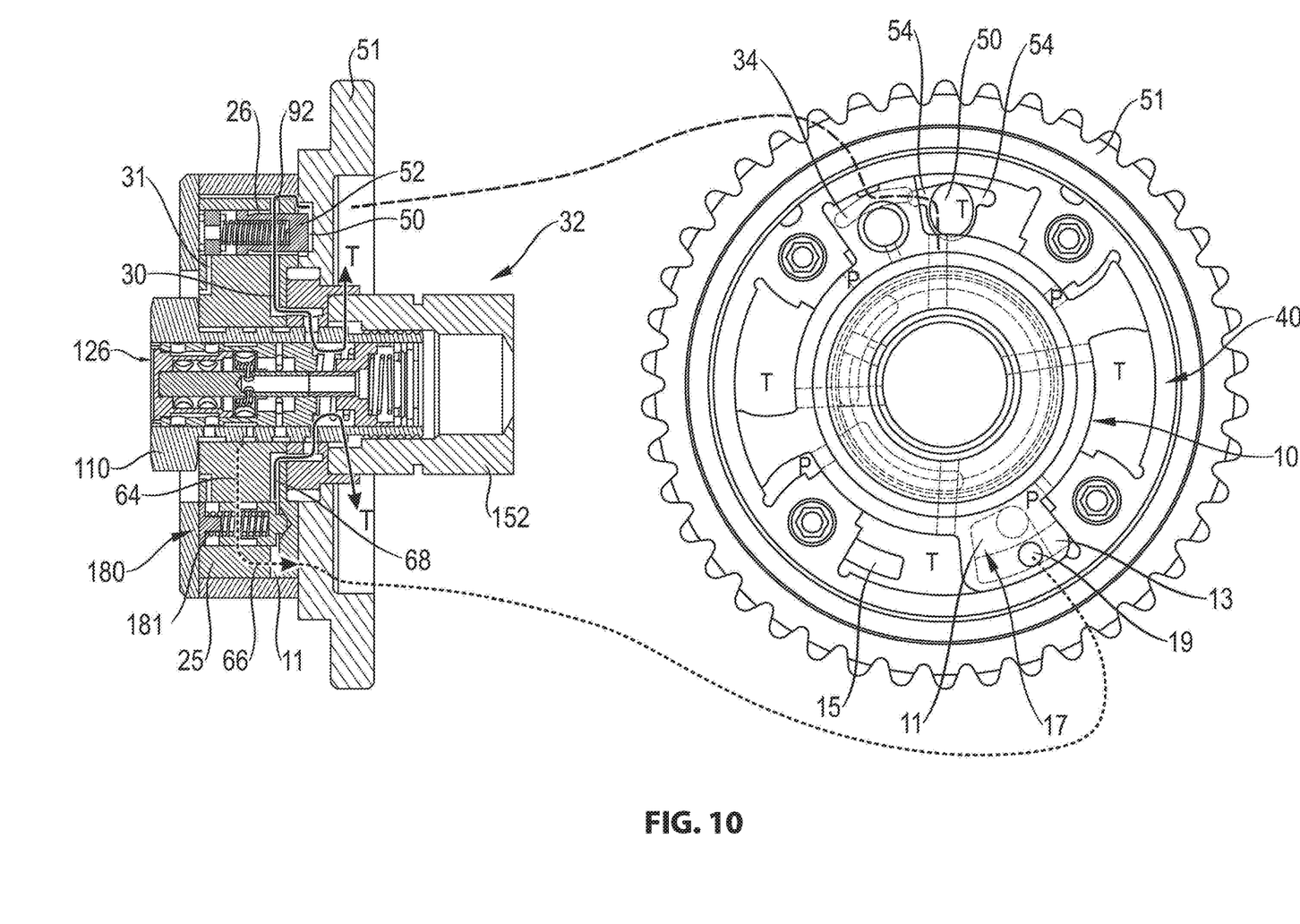
FIG. 10 illustrates a schematic fluid connection between center bolt oil control valve and the camshaft phaser in the starting position.

In addition to centering slot 34, the rotor 10 includes at least one additional slot, such as an additional slot 11 in one (25) of its vanes 14, for supplying pressure medium to either first or second pressure chambers 62, 60, depending on the position of the rotor 10 relative to the stator 40. This will be described in more detail infra. As shown in FIG. 1, the slot 11 may comprise a recess 17 provided in the external surface 36 of the rotor 10 and a fluid passageway 19 into the vane 25 disposed in the recess 17, wherein the fluid passageway 19 is in fluid communication with the center bolt oil control valve 32 as shown in FIG. 10.

Figure 2:
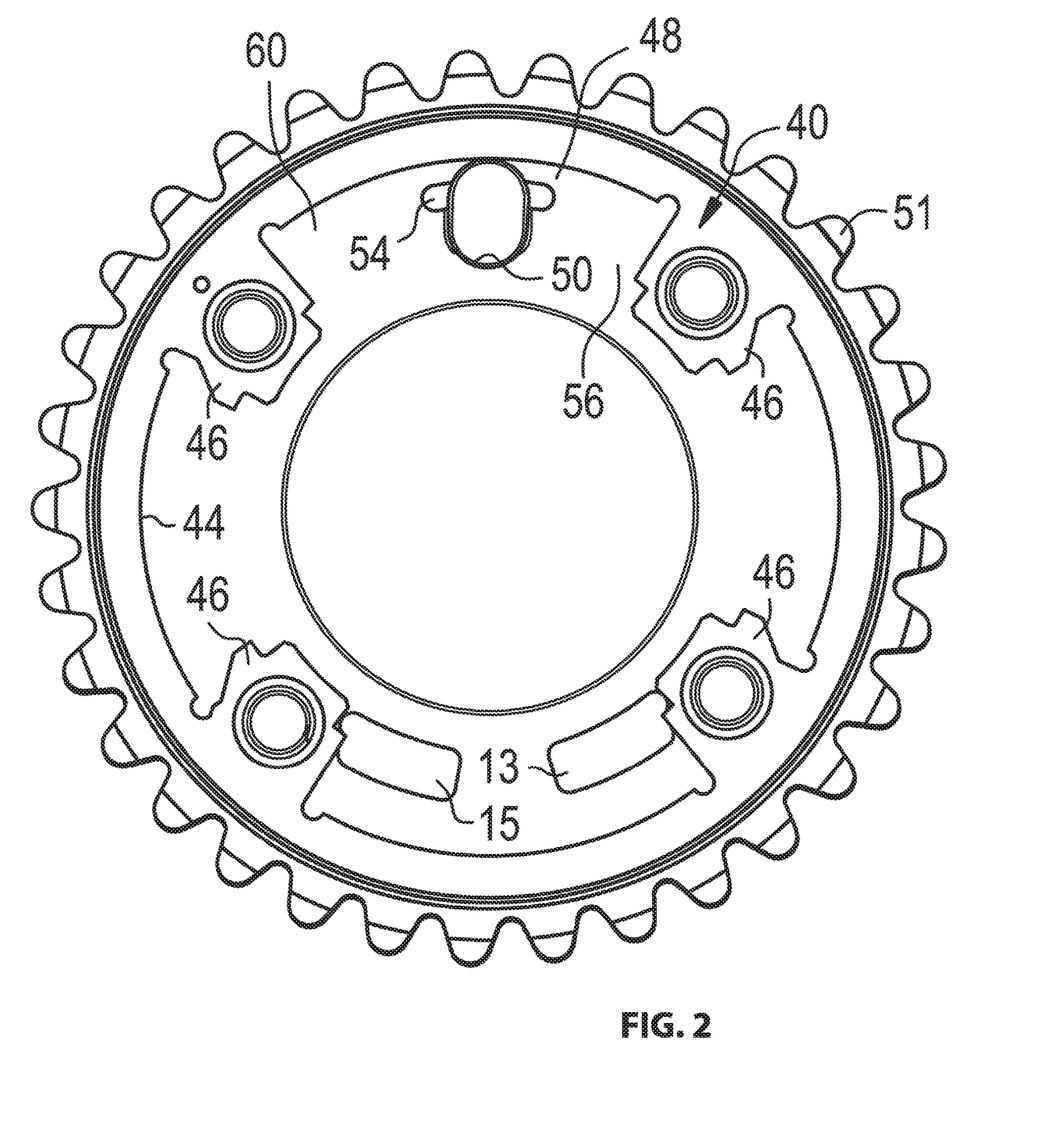
FIG. 2 is a front view of a stator component of the valve timing control device or cam phaser which is in accordance with an embodiment of the present invention.

As shown in FIG. 2, another component of the valve timing control device comprises the stator 40. The stator 40 is drive-connected to a crankshaft (not shown) by means of a drive element (also not shown) which engages a drive wheel 51. The stator 40 comprises a cylindrical stator base 44, and webs 46 protrude from the base 44, radially toward the inside. The webs 46 are spaced apart, and in one of these spaces 48, between two of the webs 46, is a lock pin bore 50 configured in an external surface plate 56 (such as sprocket or cover) to receive the lock pin 52, thereby locking the position of the rotor 10 relative to the stator 40 (see FIGS. 3 and 10).

As shown in FIG. 2, preferably a centering slot 54 is also formed in the external surface plate 56 of the stator 40, proximate the lock pin bore 50. As will be described more fully later herein, this centering slot 54 works to provide that pressure medium can move from one of the chambers through this slot then along the centering slot 34 in the rotor 10, and to the pressure medium control valve chamber 26, when the rotor 10 is in certain positions relative to the stator 40, during certain stages of operation of the engine.

In addition to centering slot 54, the stator surface plate (can be sprocket or cover) 56 includes additional recesses or slots 13, 15, with which the slot 11 provided in the rotor 10 cooperates, for supplying pressure medium to either pressure chambers 60, 62, depending on the position of the rotor 10 relative to the stator 40. Each of the slots 13, 15 may comprise a recess in the stator surface plate 56.

One or more of the rotor 10, stator 40 and stator surface plate 56 may be sintered, during which time the slots 11, 13, 15, 34, 54 become formed. While FIGS. 1 and 2 depict a centering slot 34, 54 being provided on each of the rotor 10 and the stator surface plate 56, or it is possible while still staying well within the scope of the present invention to provide a centering slot on only one of these components, such as the stator surface plate 56, and/or to provide fluid channels which look completely different from the centering slots 34, 54 which are depicted herein, so long as some form of fluid path is provided from the pressure chambers 60, 62 existing between the vanes 14 and webs 46, to the pressure medium control valve chamber 26. Furthermore, slots 11, 13 and 15 can also be provided as looking much different than that what is shown in FIGS. 1 and 2 (i.e. see FIG. 10), while still staying well within the scope of the present invention. Additionally, fewer or more slots can be provided.

Additionally, while the term "centering" is used herein, it must be appreciated that the lock pin bore 50 need not be (and most likely would not be) provided exactly between two adjacent webs 46 of the stator 40; however, it is preferred that the lock pin bore 50 be provided at some intermediate position between the fully retarded and fully advanced positions of the rotor 10.

Figure 4:
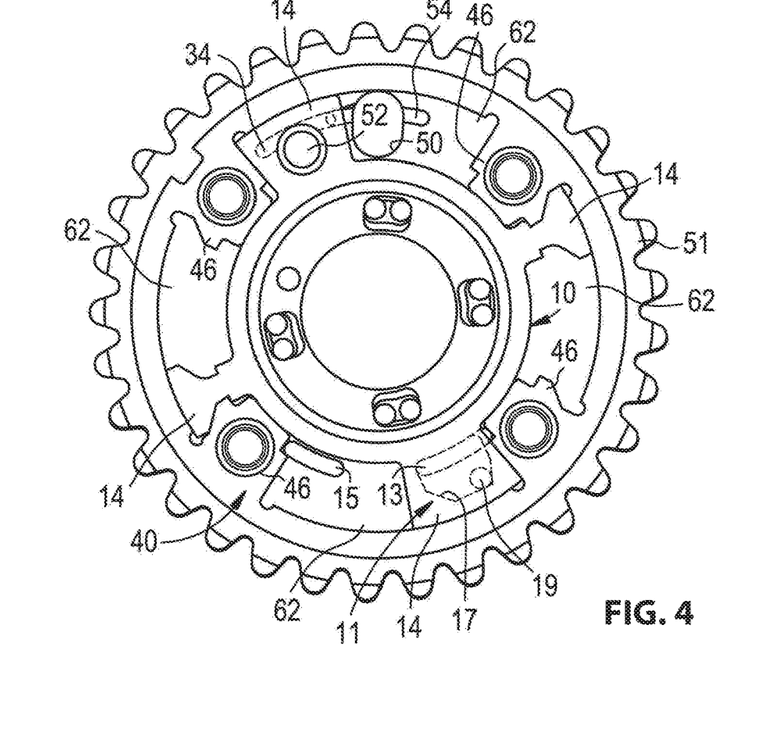
FIG. 4 is similar to FIG. 3, but shows the rotor unlocked relative to the stator, and the rotor rotated to its most advanced position relative to the stator.

FIGS. 3 and 4 show the rotor 10 engaged with the stator 40. Specifically, the rotor 10, stator 40 and surface plate 56 are engaged with each other such that the centering slots 34, 54 face each other (i.e., the external surface 36 of the rotor 10 faces the exterior surface 56 of the stator 40), and the slot 11 in the rotor 10 faces the slots 13, 15 in the surface plate 56. The rotor 10 and stator 40 are coaxial relative to each other, and each of the vanes 14 of the rotor 10 is disposed between two adjacent webs 46 of the stator 10. As such, pressure chambers 60, 62 are provided between each vane 14 and web 46. The rotor 10 provides at least one fluid path to each pressure chamber 60, 62, such that pressure medium can flow back and forth between each pressure chamber 60, 62 and the oil control valve 32 (see FIG. 5). More specifically, the internal channels 16, 18, 20 of the rotor 10 are configured such that there are two sets of pressure chambers 60, 62 disposed between the vanes 14 of the rotor 10 and the webs 46 of the stator 40, wherein every other pressure chamber 60 is a retard pressure channel, and the remaining pressure chambers 62 are advance pressure channels. During operation, providing more pressure medium pressure in the first (advance) pressure chamber 62 than the second (retard) pressure chamber 60 causes the rotor 10 to move counter-clockwise relative to the stator 10. In this case, pressure medium from the compressed retard pressure chamber 60 will be recirculated to advance pressure chamber 62 as described relating the different valve positions. On the other hand, providing more pressure medium pressure in the retard pressure chamber 60 than the advance pressure chamber 62 causes the rotor 10 to move clockwise relative to the stator 40. In this case, pressure medium from the compressed advance pressure chambers 62 will be recirculated to retard pressure chambers 60. It should be noted that the terms "advance" and "retard" depend on whether the cam phaser is used as intake or exhaust cam phaser.

Although a certain number of vanes and webs are shown in the drawings, a different number of vanes and webs can certainly be provided. Also, not every chamber needs to be active, meaning that advance and retard oil need not go to every chamber.

FIG. 3 shows a state where the rotor 10 is in a position relative to the stator 40 where the lock pin 52 can be engaged in the lock pin bore 50. In contrast, FIG. 4 shows the rotor 10 unlocked and shows a specific position—the rotor 10 in its most advanced position relative to the stator 40. Of course, the rotor 10 can be in other positions relative to the stator 40, and the specific position shown in FIG. 4 is merely provided as an example.

FIGS. 5-9 illustrates an assembled view of a first embodiment of the oil control valve 32. The oil control valve includes a central cylindrical valve housing 110, a first spring 112, a calibration cap 114, a second spring 116, a supply check valve 118, a flow disc 120, a supply filter 22, a snap ring 124, a piston assembly 126, a piston 130, first check valve 132, second check valve 133, a check valve tube 134 and a check valve spring 136. The plate check valves 132, 133 are axially arranged in the piston 130 and have equal opening directions, opposite opening directions are possible alternatively (see FIG. 12). They abut on a recess of the piston 130 respectively of a retaining cap 160. In order to hydraulically supply the cam phaser plural connections A, B, P, T, S, L are provided. The retaining cap 160 closes the left end of the piston 130 tightly and retains the check valve tube 134.

The oil control valve 32 is pressure balanced by the differential diameters D1, D2, D3 of the piston 130 which is positioned by an external actuator (not shown). The hollow piston 130 has, adjacently, following said first outside diameter D3 a lateral surface with a large outside diameter D2 and a lateral surface with a small outside diameter D1. As the valve housing 110 is so-called central or end feed bolt (housing) a supply pressure introduced into a axial supply port 142 for connection P is applied firstly to a projected circular surface, which is formed by the small outside diameter D1 of the piston 130, such that a force F1 is effective in an axial direction. The supply pressure is applied secondly to a projected annular surface which is formed from the large outside diameter D2 minus the first outside diameter D3 of the piston 130, such that a force F2 is effective in an opposite axial direction. The hollow piston 130 is pressure balanced since the circular surface D1 is at least nearly identical to the annular surface (large outside diameter D2 minus the first outside diameter D3).

Figure 5:
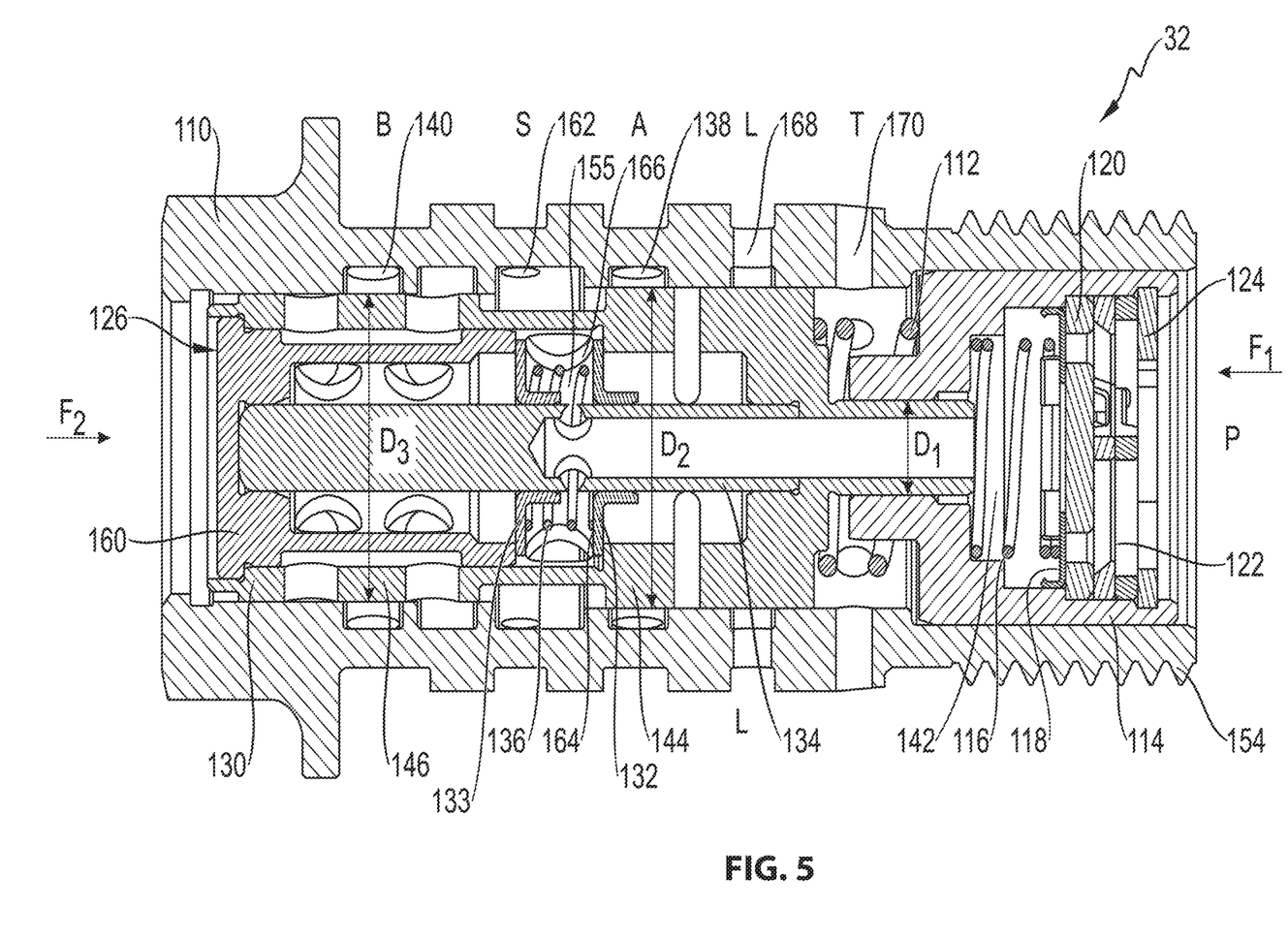
FIG. 5 illustrates a first embodiment of a center bolt oil control valve for a cam phaser of an internal combustion engine.

Locating the supply check valve 118, the flow disc 120 and the filter 122 within calibration cap 114 enables installation in a short axial package.

The valve housing 110 includes a threaded portion 154 for attachment to a camshaft or a cam nose 152.

Figure 6:
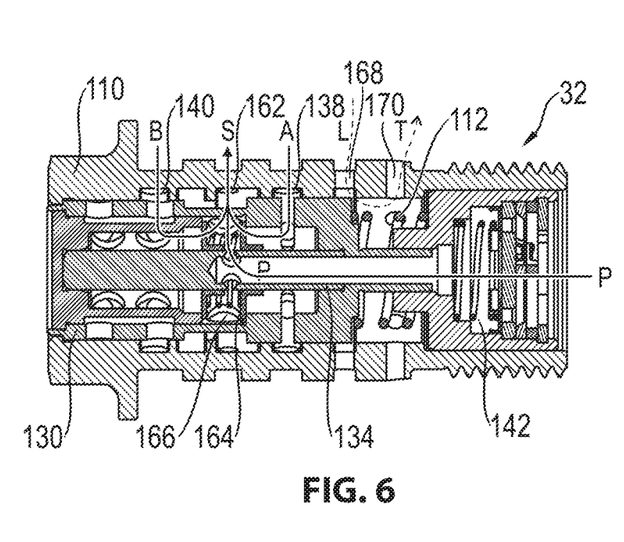
FIG. 6 illustrates the center bolt oil control valve with 0 mm of piston travel (starting position)

FIG. 6 illustrates the starting position of the piston 130 oil control valve 32 with 0 mm of piston travel and the corresponding fluid connections. In the starting position, a self-centering port 162 associated with self-centering connection S is connected to supply P via the pressure supply port 142, the check valve tube 134, openings 164 of the check valve tube 134 and openings 166 in the piston 130. Additionally, check valves 132, 133 allow cam torque recirculation of oil from an advancing port 138 associated with connection A and from a retarding port 140 associated with connection B to the self-centering port 162.

A control chamber 155 is visible that is formed during the assembly and arranged within the piston 130 between two check valves 132, 133 and a compression check valve spring 136 which seats the check valves. The control chamber 155 is connected permanently in a fluid conducting manner by the openings 164 of the check valve tube 134 with the axial supply port 142. Thus, the self-centering port 162 and therefore the self-centering connection S is also connected permanently in a fluid conducting manner by the openings 164 of the check valve tube 134 with the axial supply port 142 and the supply connection P. In this position, a smaller volume of S and P result in more effective cam torque recirculation.

This position is for self-centering and locking the rotor 10 relative to the stator 40. This position occurs, for example, upon engine shut down or stall, due to the spring 112 pushing the piston 130 to its left end-most position. In this state, the rotor 10 is automatically urged to its mid-lock position so the lock pin 52 can lock the rotor 10 relative to the stator 40. While one chamber (either the advance pressure chambers 62 or the retard pressure chambers 60, depending on the position of the rotor 10) exhausts into through the lock pin 52 (i.e., via centering slots 34, 54 (see FIGS. 1 and 2)), a directional supply of oil is provided to the other chamber via the slot 11 and either slot 13 or 15 (see FIG. 2). The fluid path for the exhaustion through the lock pin 52 is shown in FIG. 10, and provides that oil flows from the lock pin 52, into a locking pin port 168 associate with locking pin connection L of the oil control valve 32, through oil control valve 32 to a tank port 170 associate with tank connection T. During this state, oil pressure from the oil pump is blocked to the advance pressure chambers 62 and retard pressure chambers 60 by lands 144, 146 on the piston 130 and the check valves 132, 133. However, cam torques can open a check valve 132, 133 and recirculate oil to assist the supply pressure to connection S.

Figure 7:
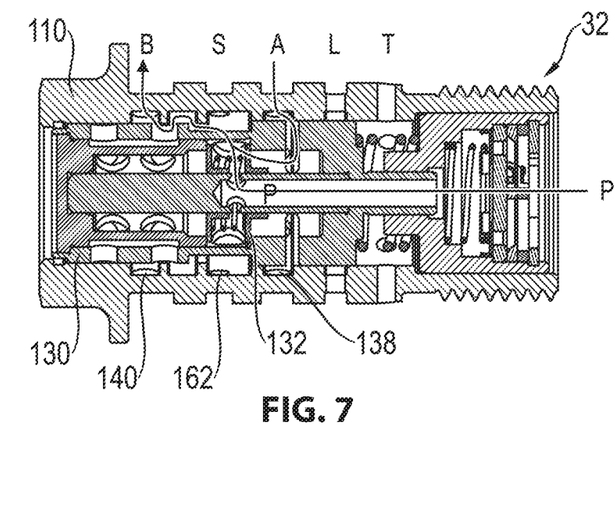
FIG. 7 illustrates the center bolt oil control valve with 1.5 mm of piston travel.

FIG. 7 illustrates the oil control valve 32 with 1.5 mm of piston travel. In this position retarding port 140 and self-centering port 162 are connected to supply P. Additionally, first check valve 132 allows recirculation of oil from the advancing port 138 to the retarding port 140.

Figure 8:
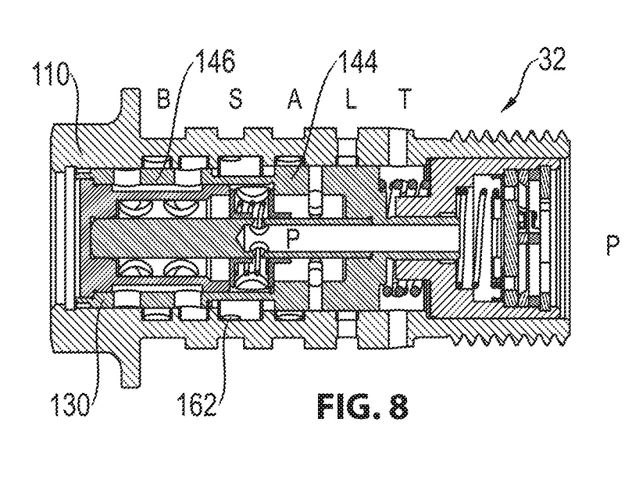
FIG. 8 illustrates the center bolt oil control valve with 2.6 mm of piston travel (middle or hold position)

FIG. 8 illustrates the oil control valve 32 with 2.6 mm of piston travel (middle or hold position). In middle position which is also shown in FIG. 5, the piston lands 144, 146 block A and B to hold the cam phaser position. There is no recirculation or exhaust in the middle or hold position. Only self-centering port 162 is connected to supply P.

Figure 9:
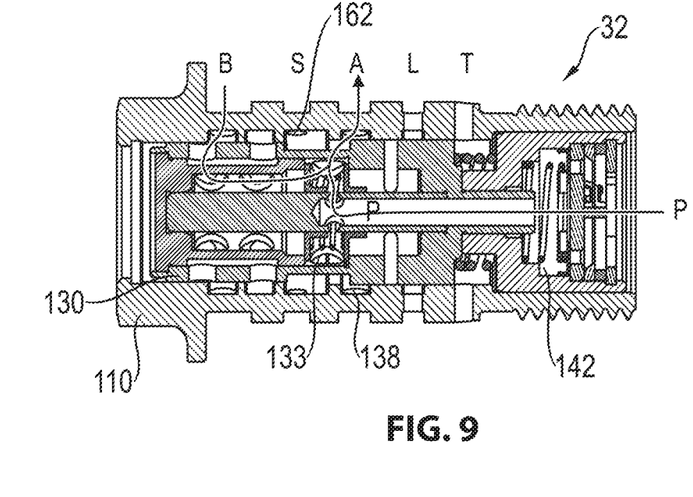
FIG. 9 illustrates the center bolt oil control valve with 3.7 mm of piston travel (end position)

FIG. 9 illustrates the center bolt oil control valve 32 with 3.7 mm of piston travel (end position). In the end position, the advancing port 138 is connected to supply P and the supply port 142 and the second check valve 133 results in recirculation of oil from B to A. Additionally, self-centering port 162 is connected to supply P.

As can be seen from FIG. 10 another vane of the rotor 10 includes a self-centering spool 180. This self-centering spool 180, when open (right position in FIG. 10), supplies oil to the directional supply (i.e., the slot 11 in the rotor 10), which oil thereafter may supply the advance or retard pressure chambers 62, 60, depending on the position of the rotor 10, and allows self-centering. The position "open" of the self-centering spool 180 occurs, when a self-centering spool spring 181 has greater force than the lock pin pressure against the spool (lock pin exhausting). When the lock pin connection L is blocked by the OCV 32, pressure builds in the circuit and shifts the self-centering spool 180 which blocks the self-centering flow.

The rotor 10 also includes passageways 64, 66 associated with the self-centering spool 180. Specifically, one or more passageways 64 are provided in the rotor 10 for fluid communication between the self-centering spool 180 and the oil control valve 32 for receiving oil from supply connection P through self-centering connection S of the oil control valve 32. One or more passageways 66 are also provided in the rotor 10 for fluid communication between the self-centering spool 180 and the slot 11 on the rotor 10 for supplying oil to said slot 11. Finally, one or more passageways 68 are also provided in the rotor 10 for fluid communication between the oil control valve 32 and the self-centering spool 180 in order to shift the self-centering spool 180 (shut off centering flow P), and for receiving oil from the self-centering spool 180.

Regardless of its exact configuration, the oil control valve 32 provides a plurality of ports, which facilitate fluid flow. These ports are identified with letters in the Figs. Specifically, the letter P identifies fluid flow from the oil pump, the letter A identifies fluid flow associated with the advance chamber, the letter B identifies fluid flow associated with the retard chamber, the letter S identifies fluid flow to the directional supply (i.e., slot 11), the one letter L identifies fluid flow associated with unlocking the lock pin (and the lock pin locking), the other letter L identifies fluid flow associated with shifting the supply valve, and the letter T identifies fluid flow to tank T. In fact, these letter conventions are used herein with regard to all embodiments described. These letter conventions are common in the industry.

Figure 11:
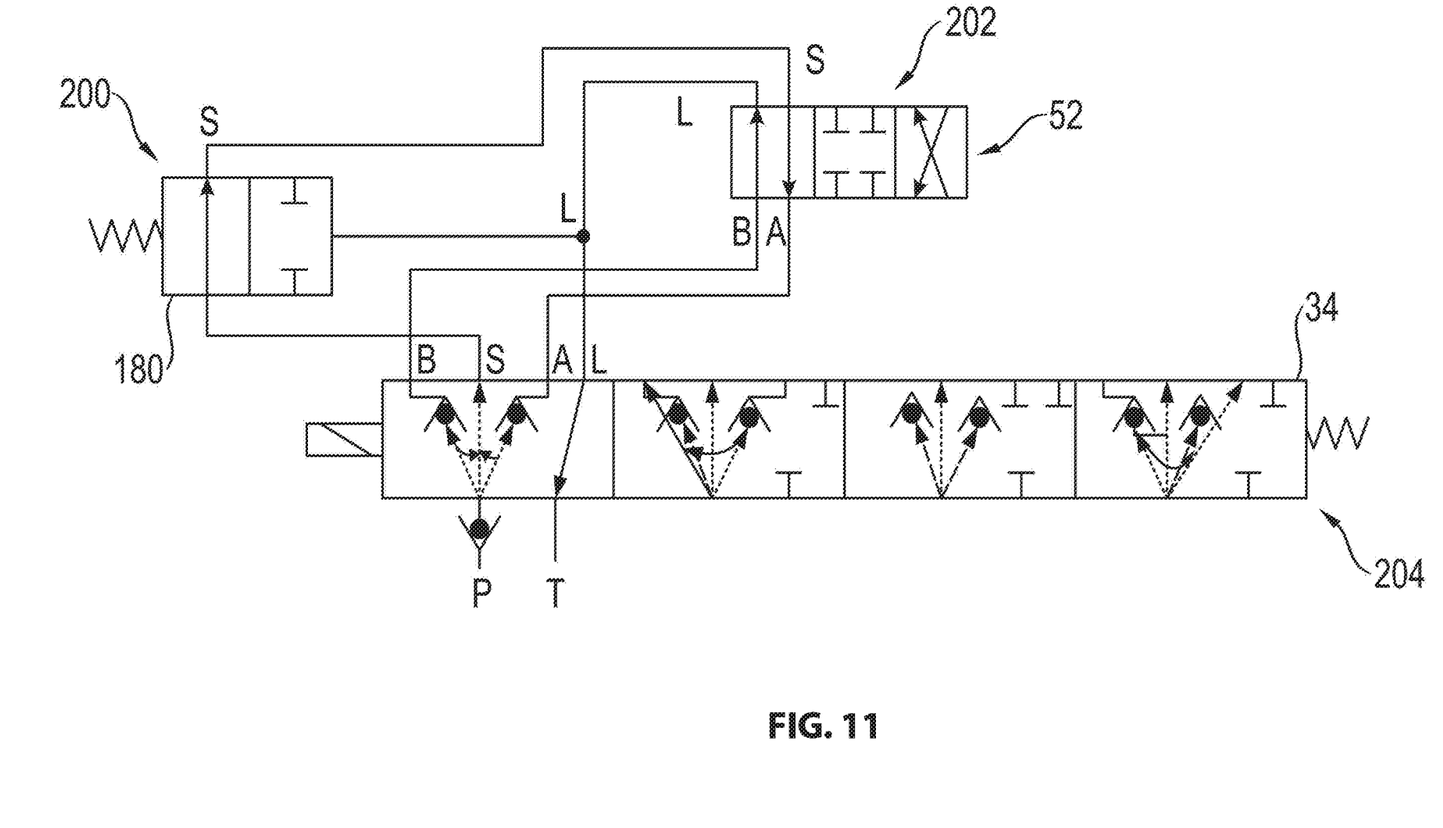
FIG. 11 illustrates a state diagram showing the various states of the center bolt oil control valve relating to FIGS. 5-10.

FIG. 11 provides a self-explanatory state diagram with regard to the different states of the lock pin 52, the self-centering spool 180, and the oil control valve 32 which have been just described, wherein section 200 of state diagram shows the states of the self-centering spool 180, section 202 of state diagram shows the states of the lock pin 52, and section 204 of the state diagram shows the states of the oil control valve 32. With regard to section 204, moving left-to right, the states correspond to the different states of the oil control valve 32 which are shown in FIGS. 6, 7, 8 and 9. As shown, in the left-most state of the oil control valve (FIG. 6), the lock pin 52 of the rotor 10 can be in one of three positions—advanced of the lock pin bore 50, over the lock bore 50, or retard of the lock pin bore 50. In this state, the self-centering spool 180 allows flow for self-centering (see FIG. 10). However, in the other states of the oil control valve 32 (FIGS. 7-9), the self-centering spool 180 is closed and the lock pin 52 is unlocked.

The self-centering port 162 is connected permanently in all positions of the OCV 32 in a fluid conducting manner with the axial supply port 142. This allows self-centering if engine stalls as soon as oil pressure drops enough to move the self-centering spool 180. The oil control valve 32 has the advantage of combining improved packaging and more effective cam torque recirculation. As the self-centering port 162 is permanently connected with constant pressure with the axial supply port 142 in all positions of the oil control valve 32, the design allows self-centering if engine stalls as soon as oil pressure drops. Thus, this design will also find its way back to the mid-lock position even if the car engine fails, so that the oil control valve 32 has a fail-safe function.

Figure 12:
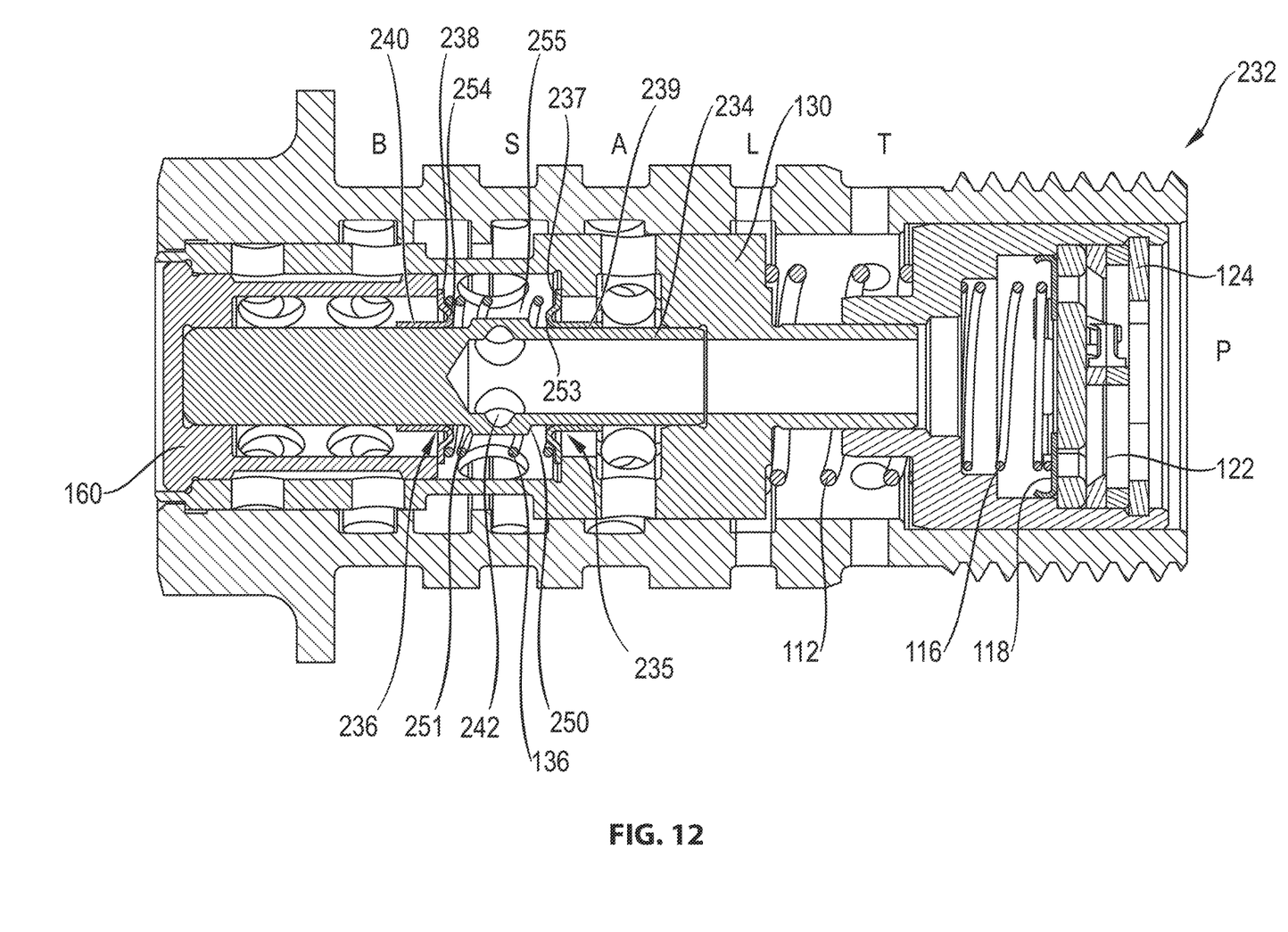
FIG. 12 illustrates a second embodiment of a center bolt oil control valve for a cam phaser of an internal combustion engine.

FIG. 12 illustrates a second embodiment of a center bolt oil control valve (OCV) 232 for a cam phaser of an internal combustion engine. It only differs from the first embodiment in the design of check valve tube 234, first and second check valve 235, 236. The function is the same as described. Therefore, only the differences are described below. Same or similar components are marked with the same reference numbers.

The check valves 235, 236 which include opposite opening directions and enable cam torque recirculation are configured with a first disc portion 237, 238 a second disc portion 239, 240 and the check valve spring 136 that is thus configured as a compression coil spring. Thus, the first disc portion 237 and the second disc portion 239 forms the first check valve 235 and the first disc portion 238 and the second disc portion 240 forms the second check valve 236. A respective outer edge is arranged at the first discs portions 237, 238, which can be configured in the non-illustrated embodiment with additional radial seals or seal elements at the outer edges. As can be seen from FIG. 12 the outer edges are biased against a reduced diameter of the piston 130 and the retaining cap 160.

Openings 242 are arranged at the hollow check valve tube 234 in a radially circumferential manner.

The second disc portions 239, 249 are axially movable on the check valve tube 234, wherein the check valve tube 234 is configured with stop elements 250, 251 to limit an axially movement of the check valves 235, 236 against the direction of the abutments at the piston 130 and the retaining cap 160.

A control chamber 255 is visible that is formed during the assembly and arranged within the piston 130 between two check valves 235, 236 and a compression check valve spring 136 which seats the check valves. The control chamber 255 is connected permanently in a fluid conducting manner by the openings 242 of the check valve tube 234 with the axial supply port 142. Thus, the self-centering port 162 and therefore self-centering connection S is also connected permanently in a fluid conducting manner by the openings 242 of the check valve tube 334 with the axial supply port 142 and the supply connection P. In this position, a smaller volume of S and P result in more effective cam torque recirculation.

Thus, the control valve 232 according to the invention is configured very short or compact in the axial direction which saves space in the joint arrangement with the cam phaser and provides space for new functional components as required. It can advantageously be ensured that the supply connection P remains open during a cam torque recirculation function (CTR).

Furthermore, the stop elements 250, 251 are advantageously configured as one or two larger diameter portions of the check valve tube 234. Thus, the CTR function with a best reaction is ensured easily and cost-effective. Furthermore, the stop elements 250, 251 insure that supply port P is fully open in all positions.

Check valve spring 136 is arranged between the first disc portions 237, 238 and ends of the spring 136 are guided by axial disc projections 253, 254, which connect the first disc portions 237, 238 with the second disc portions 239, 240 of the check valves 235, 236. This optimized design prevents the check valves 235, 236 and the spring 136 from tipping or wedging and prevents the check valves 235, 236 from wearing out.

All of the embodiments disclosed herein provide a valve timing control device or cam phaser which consumes less oil, reduces the amount of time it takes to get to a mid-lock position when oil pressure and flow are limited, and does not rely on electronic control to get to that mid-lock position. Cam torque can be used to recirculate oil, in order to assist locating the cam phaser to its mid-lock position.

As self-centering port S is connected permanently in all positions of the OCV 32, 232 in a fluid conducting manner with the axial supply port 142, self-centering is improved. The smaller volume of S and P in self-centering position allows more effective cam torque recirculation.

Additionally, concentricity of the piston assembly 126 simplifies the assembly of the OCV 32, 232.

The described embodiments only involve exemplary configurations. A combination of the features described for different embodiments is also possible. Additional features, particularly those which have not been described, for the device parts belonging to the invention can be derived from the geometries of the device parts shown in the drawings.

While specific embodiments of the invention have been shown and described, it is envisioned that those skilled in the art may devise various modifications without departing from the spirit and scope of the present invention.

What is claimed is:

1. An oil control valve for a cam phaser of an internal combustion engine, the oil control valve comprising:
   a valve housing, including a first operating connection, a second operating connection, a supply connection, and a tank drain connection configured to drain a hydraulic fluid;
   a piston assembly, including a piston, a hollow check valve tube, a first check valve and a second check valve configured to provide cam torque recirculation, wherein the piston assembly is arranged in the housing axially displaceable by an actuator, wherein a control chamber is arranged within the piston between the first check valve and the second check valve and wherein a check valve compression spring which closes the first check valve and the second check valve is arranged within the piston between the first check valve and the second check valve, wherein the valve housing includes a self-centering connection and a locking pin connection configured to self-center and lock a rotor relative to a stator, and wherein the self-centering connection is connected to the supply connection (P) in all axial positions of the piston in the housing.

2. The oil control valve according claim 1, wherein the control chamber is permanently connected to the supply connection by openings of the hollow check valve tube and the control chamber is permanently connected to the self-centering connection by openings of the piston.

3. The oil control valve according claim 1,
wherein the first operating connection is associated with an advancing port, the second operating connection is associated with a retarding port, the supply connection is associated with a pressure supply port, the tank drain connection is associated with a tank port, the locking pin connection is associated with a locking pin port and the self-centering connection is associated with a self-centering port, and wherein the advancing port, the retarding port, the tank port, the locking pin port and the self-centering port are configured as radial openings in the valve housing and the pressure supply port is configured as an axial opening in the valve housing.

4. The oil control valve according claim 3, wherein the self-centering port is arranged axially between the advancing port and the retarding port and the locking pin port is arranged axially between the advancing port and the tank port.

5. The oil control valve according claim 3, wherein the piston is configured axially movable into four positions including:

a starting position of the piston configured to self-center and lock the rotor relative to the stator, wherein the self-centering port is connected to the pressure supply port and the first check valve and the second check valve provide cam torque recirculation of oil from the advancing port and from the retarding port to the self-centering port, and wherein the locking pin port is connected to the tank port, a second position of the piston, wherein the retarding port and the self-centering port are connected to the pressure supply port and wherein the first check valve provides recirculation of oil from the advancing port to the retarding port, and wherein the connection between the locking pin port to the tank port is blocked, a center position of the piston, wherein piston lands block connections to the advancing port and the retarding port, and an end position of the piston, wherein the advancing port is connected to the pressure supply port, wherein the second check valve provides recirculation of oil from the retarding port to the advancing port, wherein the connection between the locking pin port and the tank port is blocked, wherein the self-centering port is permanently connected to the pressure supply port.

6. The oil control valve according claim 5, wherein the piston is axially pressure balanced by three different diameters of the piston.

7. The oil control valve according claim 1,
wherein the first check valve includes a first disc portion and a second disc portion and the second check valve includes a third disc portion and a fourth disc portion and the first check valve and the second check valve are pressed apart from each other by the check valve spring so that the control chamber is formed between the first disc portion and the third disc portion, and wherein the second disc portion and the fourth disc portion are axially movable on the check valve tube in opposite opening directions.

8. The oil control valve according claim 1, wherein the check valve tube includes stop elements configured to limit an axial movement of the first check valve and the second check valve in a direction towards the control chamber.

9. The oil control valve according to claim 8, wherein the stop elements are configured as larger diameter portions of the check valve tube.

10. A cam phaser of an internal combustion engine, the cam phaser comprising: the oil control valve according to claim 1.

11. The cam phaser according to claim 10, further comprising:

the rotor including a plurality of vanes;

the stator engaged by the rotor, the stator including a plurality of webs, wherein first chambers and second chambers are provided between each of the webs and the vanes;

a locking pin which is arranged in a pressure medium control valve chamber and locks the rotor relative to the stator at a mid-lock position, wherein the oil control valve is flow connected with the rotor, wherein an axial face of the rotor includes a centering slot, wherein the centering slot is flow connected with the pressure medium control valve chamber, and wherein the axial face of the rotor includes at least one slot configured to supply oil to the first chambers or the second chamber as a function of a position of the rotor relative to the stator.

12. The cam phaser according to claim 11, further comprising:

a self-centering spool which is arranged in a vane from the plurality of vanes and configured to supply oil to the first chambers or the second chamber from the supply connection through the self-centering connection of the oil control valve as a function of the position of the rotor relative to the stator.

* * * * *